(12) United States Patent
Konishi et al.

(10) Patent No.: US 7,612,530 B2
(45) Date of Patent: Nov. 3, 2009

(54) BRIDGE BATTERY VOLTAGE EQUALIZER

(75) Inventors: Yoshihiro Konishi, Hsinchu (TW);
Tain-Syh Luor, Hsinchu (TW); Yi-Shuo Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 252 days.

(21) Appl. No.: 11/602,201

(22) Filed: Nov. 21, 2006

(65) Prior Publication Data
US 2008/0116850 A1 May 22, 2008

(51) Int. Cl.
*H02J 7/00* (2006.01)
(52) U.S. Cl. .................. 320/120; 320/118; 320/119; 320/121
(58) Field of Classification Search .............. 320/118, 320/119, 120, 121
See application file for complete search history.

(56) References Cited
U.S. PATENT DOCUMENTS 4,041,363 A * 8/1977 Scheidler .............. 320/123
5,631,534 A * 5/1997 Lewis .................. 320/103
5,659,237 A * 8/1997 Divan et al. ............ 320/119

FOREIGN PATENT DOCUMENTS

JP    1998-052061 A    2/1998

* cited by examiner

*Primary Examiner*—Edward Tso
*Assistant Examiner*—Samuel Berhanu
(74) *Attorney, Agent, or Firm*—Bacon & Thomas, PLLC

(57) ABSTRACT

This present invention provides a bridge battery voltage equalizer to equalize the voltages of the serially connected battery strings, comprising at least one battery crossing over an energy-transferring circuit. A plurality of the energy-transferring circuits are interconnected in a bridge architecture. Each energy-transferring circuit having four nodes comprises a first semiconductor switch, a first diode, a second semiconductor switch, a second diode, and an inductor. One end of the first element switch is connected to a negative pole of the first diode thereto. A positive pole of the second diode is connected to one end of the second element switch thereto. The inductor is an energy storing element that crosses over between the negative pole of the first diode and the positive pole of the second diode.

8 Claims, 8 Drawing Sheets

BRIDGE BATTERY VOLTAGE EQUALIZER

FIELD OF THE INVENTION

The present invention relates to a voltage equalizer for serially connected batteries, and more particularly, to a bridge battery voltage equalizer.

BACKGROUND OF THE INVENTION

Except a few low-voltage and low-power electronic apparatuses, the majority of batteries are connected in series in use, because the voltage of a single battery cell is not high enough, so its power loss is greater when it is used alone. For example, under the same load power, the voltage and capacity for a system of four batteries connected in series are four times as powerful as that of a single battery. However, the required output current is only one-fourth of that required for the single battery system. In this way, transmission loss is reduced by 16 times. Although there are advantages inherent in applying serially connected battery strings, practically speaking, its overall efficiency is less than expected, if the serially connected battery strings are only considered as a "single battery cell" having high voltage and great capacity, without taking the differences among batteries therein into account.

Properties such as recharge-discharge capacity, recharge-discharge transfer efficiency, initial voltage, and internal resistance of secondary batteries are hardly the same, even if they come from the same batch. Therefore, if these single batteries comprising minor property differences are connected in series, the user will gradually find the life of the battery power source becomes shorter, with an increase in repeated recharges and discharges, although such property differences can hardly be recognized in the very beginning. Therefore, the batteries are frequently required to be recharged. In addition, during recharging and discharging the batteries, the temperature of the serially connected battery strings are found to be much higher than that of new batteries, because when the serially connected battery string is first used, differences among single batteries are not great. However, with more recharges and discharges, differences among these single batteries become greater. In this vicious cycle, poor performance single batteries will become even worse, thereby making the performance of the serially connected battery strings being restricted by these poor performance single batteries. Therefore, to solve the above-mentioned problems, it is necessary to monitor single batteries in the serially connected battery strings, and then use battery voltage equalizers to equalize the stored energy imbalance caused by differences in single batteries, thereby increasing the actual rechargeable and dischargeable capacity of the serially connected battery strings, and thus extend their service life.

The size of voltage of the batteries in the serially connected battery strings is related to the capacity and the charge amount stored in the batteries. To equalize the voltage of each battery, energy transfer is required. In other words, it is to dissipate the energy of higher-voltage batteries or transfer the energy of higher-voltage batteries to lower-voltage batteries. On the basis of energy dissipation, battery voltage equalizers can be classified into two types: dissipative type and non-dissipative type. The former converts the energy stored in the higher-voltage batteries into thermal energy by means of switching resistive load, or to equalize voltages by means of switching buffer capacitor. The latter transfers energy in the batteries by means of switching direct current (DC) converters, if switching loss is ignored, theoretically speaking, no-loss transmission can be achieved. On the basis of energy transfer for the non-dissipative type battery voltage equalizer, this can be further classified into two types: total charge distribution and single charge distribution. The former is to absorb or provide energy for the total serially connected batteries, in order to equalize the voltages of individual batteries, whereas the latter achieves equalization through the energy transfer among adjacent single battery cells. On one hand, if the power converters for the total charge distribution are mutually independent, it is called a distributed battery voltage-equalizing device; On the other hand, if a single power converter is utilized, then it is called a centralized battery voltage-equalizing device.

According to prior technology, FIG. 1 shows a circuit structural view of a dissipative type battery voltage-equalizing device, in which, through the actions of the switch, the energy of higher-battery-end-voltage battery 3 is dissipated on the load resistance of individual voltage equalizers 2 thereon. Although the circuit structure is simple, it is necessary to detect individual battery-end-voltages. Additionally, this also involves the issue of heat dissipation. As for non-dissipative-type battery voltage equalization technology, FIG. 2 depicts a circuit structural view of a battery voltage-equalizing device based on single charge distribution, in which two adjacent battery cells serve as equalization mechanisms by transferring energy from a higher-battery-end-voltage battery to a lower-battery-end-voltage battery. In addition, the circuit structure has modular extensibility. FIG. 3 shows a circuit structural view of a distributed battery voltage-equalizing device based on total charge distribution, in which all DC converter circuits are mutually independent. When the battery voltage is different from the mean value, DC converter circuits are started, so as to release excessive battery energy and then transfer it to the serially connected battery strings or transfer the extra energy from the serially connected battery strings to the lower-voltage battery 3. Therefore, it is highly controllable. FIG. 4 shows a circuit structural view of a centralized battery voltage-equalizing device based on total charge distribution, in which a single DC converter acts as the voltage equalizer for individual batteries in the serially connected battery strings. Theoretically speaking, this centralized battery voltage equalization circuit is small and has reduced cost.

SUMMARY OF THE INVENTION

It is one object of the present invention to provide an energy-transferring circuit of a battery voltage equalizer, in which the energy of one battery in the serially connected battery strings is transferred to the remaining batteries in the serially connected battery strings.

It is another object of the present invention to provide a bridge battery voltage equalizer suitable for a non-dissipative type battery voltage-equalizing device.

It is still another object of the present invention to provide a bridge battery voltage equalizer suitable for a hierarchical battery voltage-equalizing device.

To achieve the above objects, the present invention provides an energy-transferring circuit, which transfers the energy from one battery of the serially connected battery strings to the remaining serially connected batteries, and comprises: a first node, a second node, a third node, and a fourth node therein, characterized in that the first node, the second node, and the third node are sequentially serially connected to a first element switch and a first diode, and the third node is the positive pole (P pole) of the first diode, the second node, the third node, and the fourth node therein are sequentially serially connected to a second diode and a second element switch, and the second node is the negative pole (N pole) of the second diode; an energy storing element comprises a first end and a second end therein, and said first end is connected between the first element switch and the first diode, whereas said second end is connected between the second diode and the second element switch.

Wherein said energy storing element is an inductor.

Wherein the positive pole and the negative pole of a single battery cell are connected to the first node and the fourth node respectively.

Wherein the positive pole and the negative pole of a front battery series formed by single battery cells or serially connected batteries are connected to the second node and the first node respectively.

Wherein the positive pole and the negative pole of a back battery series formed by single battery cells or serially connected batteries are connected to the fourth node and the third node respectively.

Wherein the positive pole and the negative pole of the serially connected battery strings are connected to the second node and the third node respectively.

Wherein when the first element switch and the second element switch are turned ON, the energy-transferring circuit is in an energy storing mode, that is, single battery cells store the electrical energy into the energy storing element.

Wherein when the first element switch is turned ON whereas the second element switch is turned OFF, the energy-transferring circuit is in a first energy-releasing mode, in which the first diode is cut off due to the bias voltage of the back battery series, whereas the second diode is turned ON due to the electrical current of the energy storing element, so the energy storing element releases electrical energy to the front battery series.

Wherein when the first element switch is turned OFF whereas the second element switch is turned ON, the energy-transferring circuit is in a second energy-releasing mode, in which the second diode is cut off due to the bias voltage of the front battery series, whereas the first diode is turned ON due to the electrical current of the energy storing element, so the energy storing element releases electrical energy to the back battery series.

Wherein when the first element switch and the second element switch are turned OFF, the energy-transferring circuit is in a third energy-releasing mode, in which the first diode and the second diode are turned ON due to the electrical current of the energy storing element, so the energy storing element releases electrical energy to the serially connected battery strings.

The present invention provides a bridge battery voltage equalizer to equalize the voltages of the serially connected battery strings, characterized in that: each single battery cell crosses over an energy-transferring circuit, and the energy-transferring circuits are interconnected in a bridge architecture.

Wherein the energy-transferring circuit comprises: a first node, a second node, a third node, and a fourth node. The first node, the second node, and the third node are sequentially serially connected to a first element switch and a first diode, and the third node is the positive pole of the first diode, the second node, the third node, and the fourth node are sequentially serially connected to a second diode and a second element switch, and the second node is the negative pole of the second diode; an energy storing element comprises a first end and a second end, and the first end is connected between the first element switch and the first diode, whereas the second end is connected between the second diode and the second element switch.

The bridge battery voltage equalizer and the energy-transferring circuit made according to the embodiment of the present invention provide the present invention with simple circuit architecture, which is easy to be achieved. In addition, it is easy to assemble a modular circuit. Furthermore, the bridge battery voltage equalizer disclosed in the present invention does not need any transformer, so it is highly efficient and can be operated in a non-continuous mode to achieve zero-current switching and thus lower switching loss. In addition, the present invention provides multiple options for controlling the voltage equalization for the serially connected battery strings.

BRIEF DESCIPTION OF THE DRAWINGS

DETAILED DESCRIPTION OF THE INVENTION

While the invention will be described by way of examples and in terms of preferred embodiments, it is to be understood that those who are familiar with the subject art can carry out various modifications and similar arrangements and procedures described in the present invention and also achieve the effectiveness of the present invention. Hence, it is to be understood that the description of the present invention should be accorded with the broadest interpretation to those who are familiar with the subject art, and the invention is not limited thereto.

Figure 2:
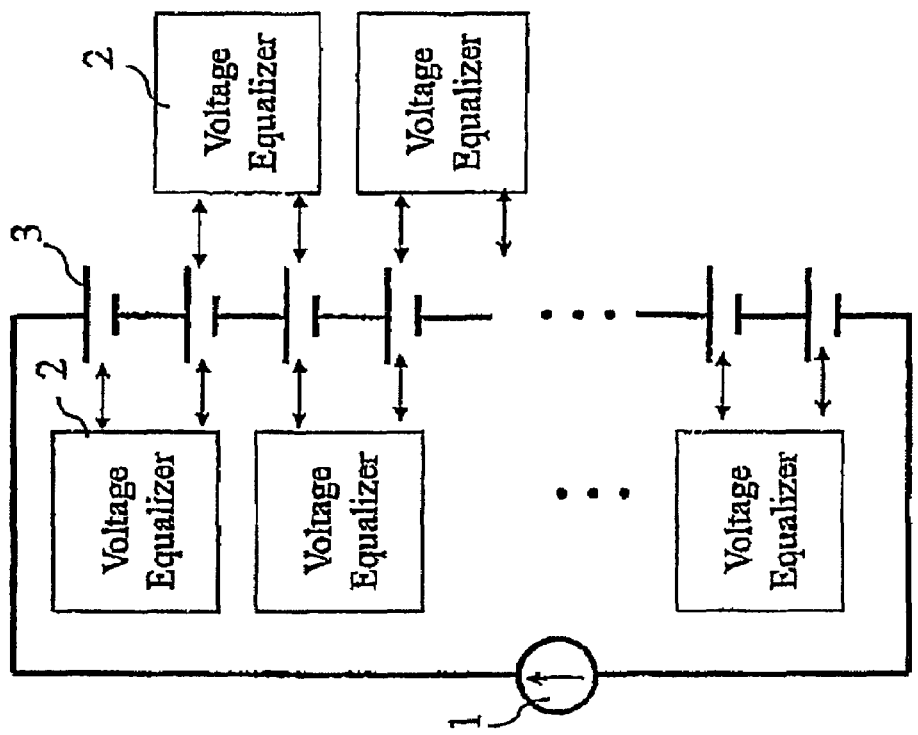
FIG. 2 shows a circuit structural view of a battery voltage-equalizing device based on single charge distribution.
Figure 1:
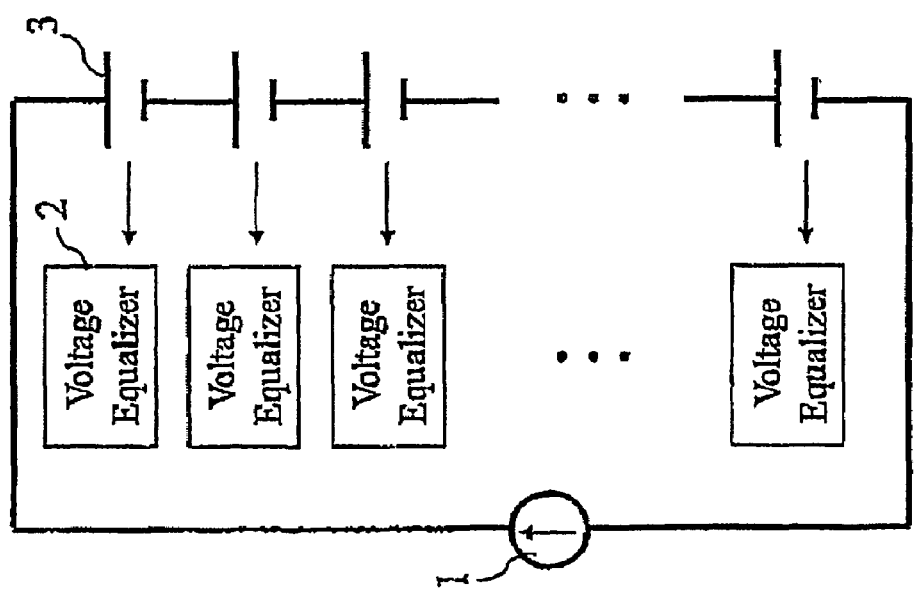
FIG. 1 shows a circuit structural view of a dissipative type battery voltage-equalizing device.
Figure 4:
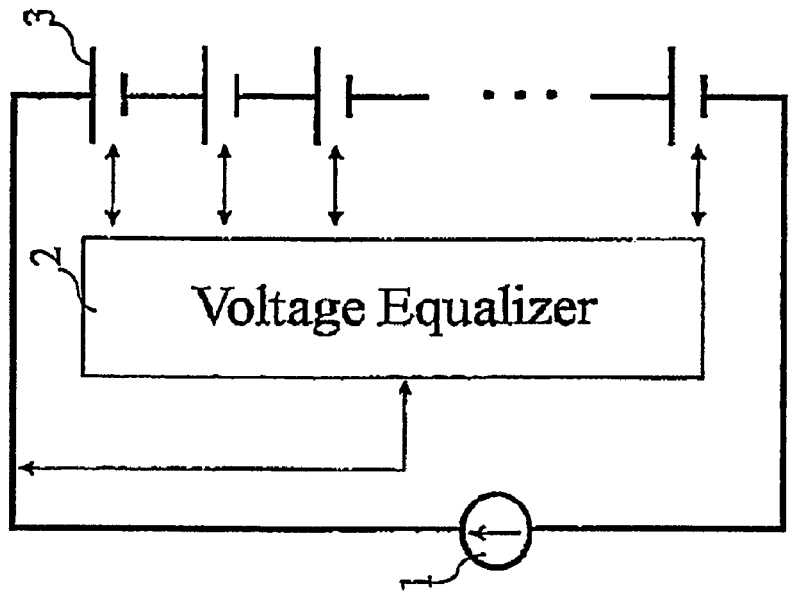
FIG. 4 shows a circuit structural view of a centralized battery voltage-equalizing device based on total charge distribution.
Figure 3:
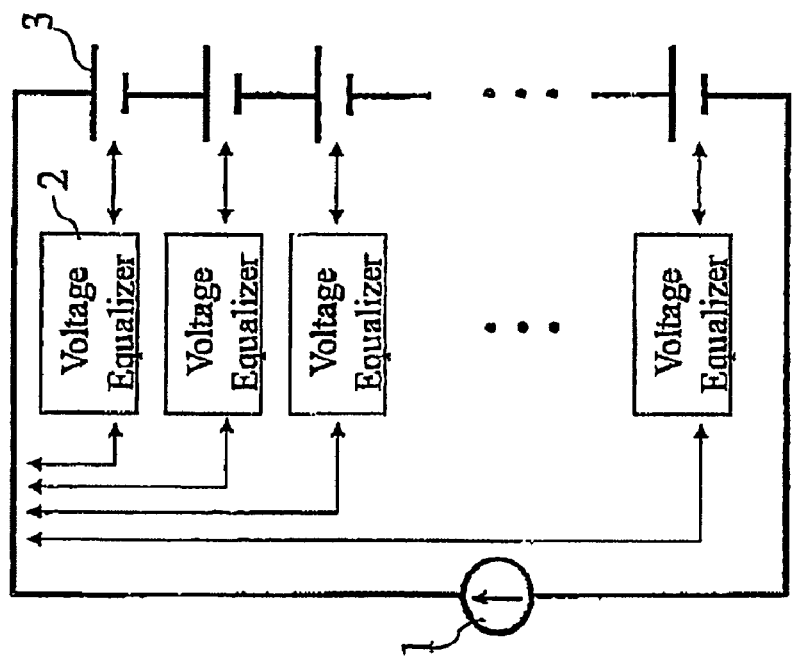
FIG. 3 shows a circuit structural view of a distributed battery voltage-equalizing device based on total charge distribution.
Figure 5:
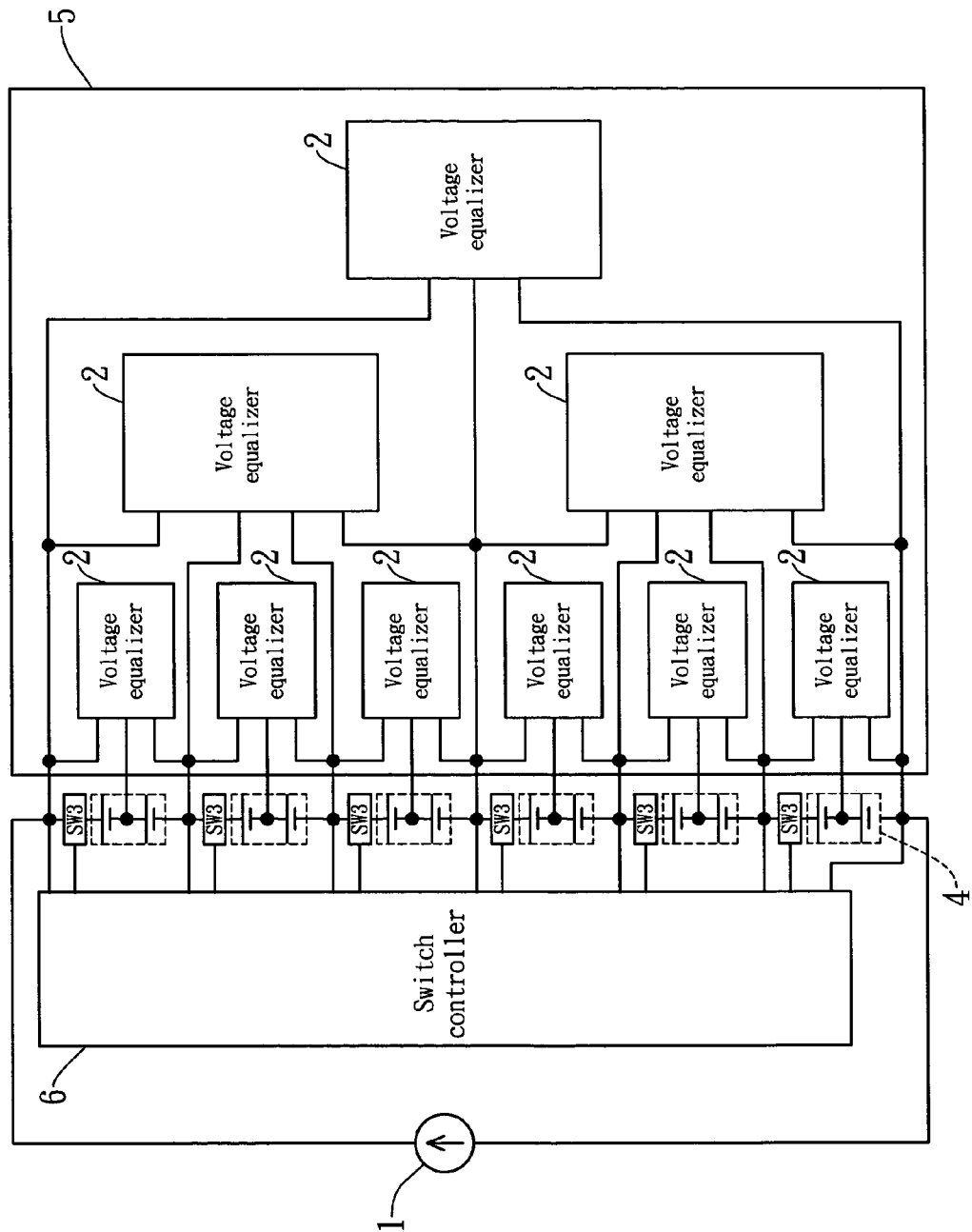
FIG. 5 shows a structural view of the hierarchical battery voltage equalization circuit of the present invention.

FIG. 5 shows a structural view of the hierarchical battery voltage equalization circuit of the present invention. The present invention provides a battery voltage-equalizing device, comprising a plurality of voltage equalizers, suitable for serially connected batteries having a great number of batteries therein. The voltage equalizers comprises a hierarchical structure 5, wherein the voltage equalizers 2 in the first layer (i.e. the lowest layer) of the hierarchical structure equalizes the voltages between adjacent single battery cells, whereas the voltage equalizers 2 in the second layer or above equalizes the voltages between adjacent serially connected battery strings 4 (or battery groups) wherein the number of batteries in the serially connected battery strings 4 (or battery groups) equalized by the voltage equalizer 2 at a higher hierarchical level is greater than the number of batteries in the serially connected battery strings 4 (or battery groups) equalized by the voltage equalizer 2 at a lower hierarchical level. The battery voltage-equalizing device further comprises a switch controller 6 and a plurality of third element switches SW3 in which each of the third element switches SW3 is serially connected to one of the serially connected battery strings 4 (or battery groups). The switch controller 6 detects the voltage difference between two ends of the serially connected battery strings 4 (or battery groups) to control the third element switches SW3 ON/OFF and the corresponding voltage equalizers 2. According to the embodiment shown in FIG. 5, the battery voltage equalizing device of the present invention schematically comprises nine voltage equalizers, for equalizing the voltages of twelve serially connected battery cells, and the voltage equalizers form a three-layer hierarchical structure 5. The first layer voltage equalizers respectively equalize the voltages between two single battery cells in the two serially connected battery cells. The connection of two battery cells in series is considered a battery group 4, so the first layer voltage equalizers 2 respectively correspond to the voltages of an equalized group of single battery cells. The second layer voltage equalizers 2 respectively equalize the voltages between three battery groups 4. In other words, a second layer voltage equalizer 2 equalizes the voltages of three serially connected battery strings. The third layer voltage equalizer equalizes the voltages between two big battery groups 4. In other words, the third layer voltage equalizer equalizes the voltages of two serially connected battery strings (each serially connected battery strings is formed by connecting six single battery cells in series.)

Figure 6:
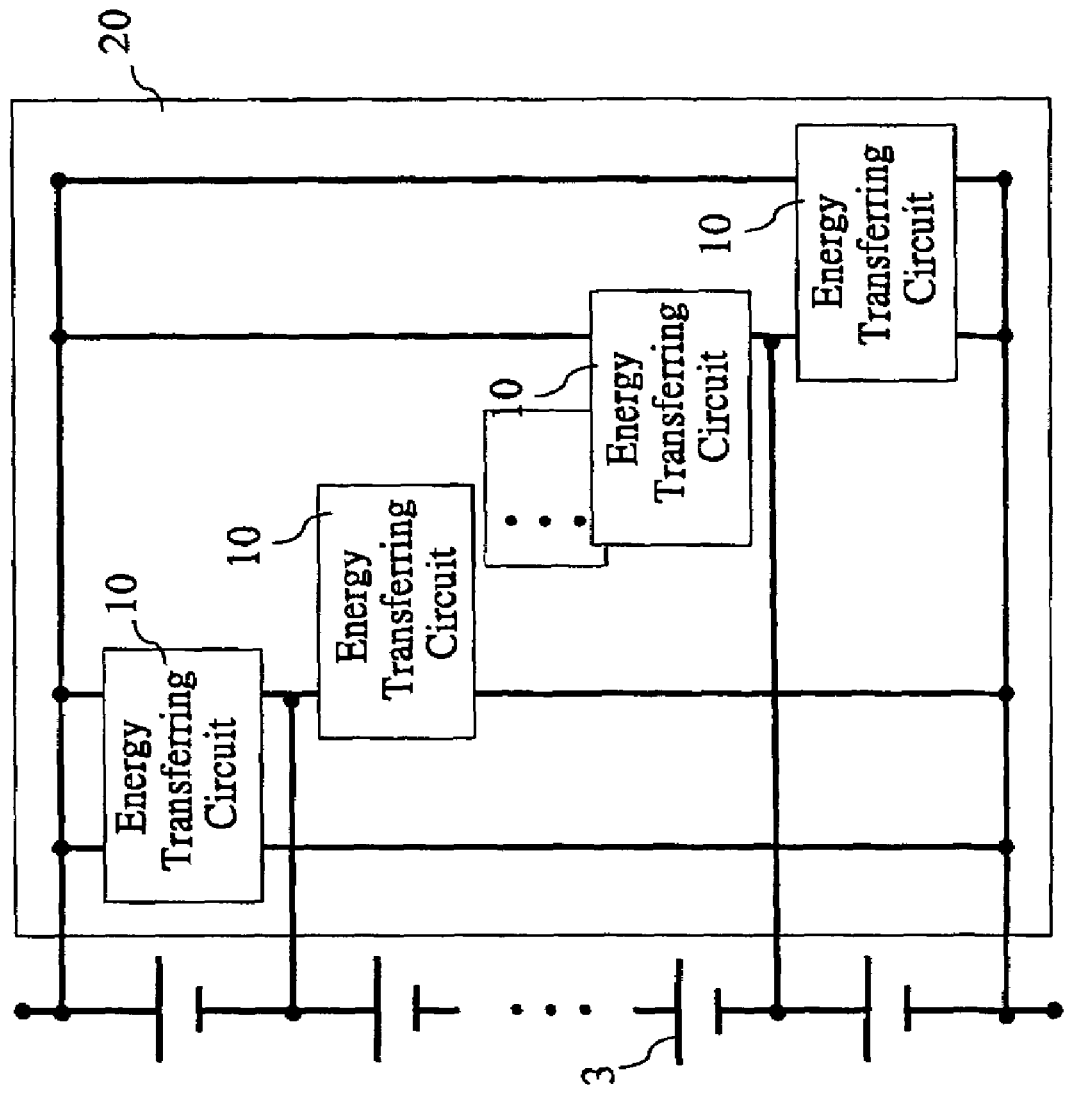
FIG. 6 shows a circuit structural view of the bridge battery voltage equalizer of the present invention.

The switch controller 6 controls the third element switches SW3 respectively, and detects the voltage differences between respective two ends of the serially connected battery strings 4 (or battery groups). When the switch controller 6 detects the charging state of one of the serially connected battery strings 4 (or battery groups) reaching saturation, the switch controller 6 turns off the third element switch SW3 to stop the serially connected battery string 4 (or battery groups) from being charged. The switch controller 6 further controls the first-layer voltage equalizers 2 of the serially connected battery strings 4 (or battery groups) to be short circuit to let the charging current pass through the voltage equalizers 2 but not pass through the serially connected battery strings 4 (or battery groups), and the serially connected battery strings 4 (or battery groups) can avoid over saturation. Referring to FIG. 6, a bridge battery voltage equalizer of the present invention is shown. The bridge battery voltage equalizer of the present invention is applied to equalize the voltages of single battery cells of the serially connected battery strings or battery groups (of serially connected battery strings). The bridge battery voltage equalizer as shown in FIG. 6 equalizes the voltages of single battery cells in the serially connected battery strings, wherein single battery cells 3 can be replaced by a battery group or a serially connected battery strings. The bridge voltage equalizer of the present invention comprises a plurality of energy-transferring circuits 10, and each of the energy-transferring circuits 10 corresponds to a single battery cell 3, or a battery group. In addition, the energy-transferring circuits 10 are configured in bridge architecture 20, as shown in FIG. 6.

Figure 7:
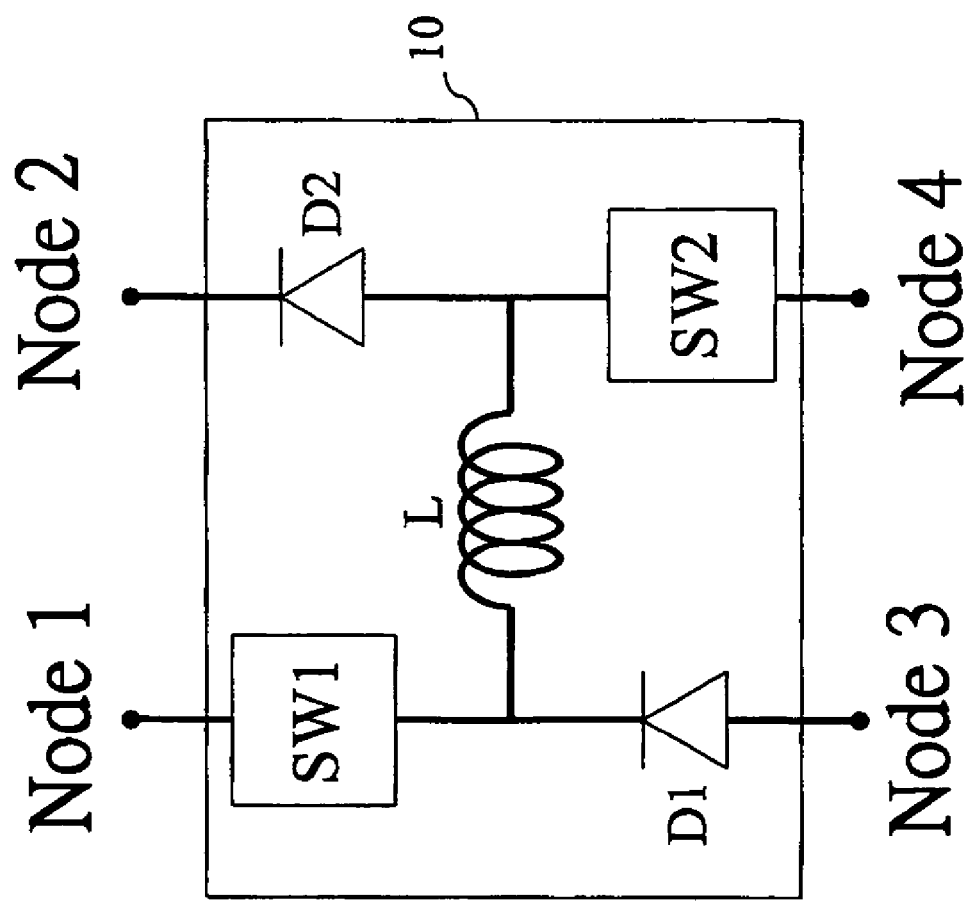
FIG. 7 shows a structural view of the energy-transferring circuit of the present invention.

Referring to FIG. 7, a structural view of the energy-transferring circuit of the present invention is shown. The energy-transferring circuit 10 disclosed in the present invention comprises a four-node network, comprising a node 1, a node 2, a node 3, and a node 4. The energy-transferring circuit 10 comprises an inductor L, a first element switch SW1, a first diode D1, a second element switch SW2, and a second diode D2, wherein the node 1, the node 2, and the node 3 are sequentially serially connected to the first element switch SW1 and the first diode D1, and the node 3 is the positive pole (P pole) of the first diode D1, the negative pole (N pole) of the first diode D1 connects one end of the first element switch SW1; the node 2, the node 3, and the node 4 are sequentially serially connected to the second diode D2 and the second element switch SW2, and the node 2 is the negative pole (N pole) of the second diode D2, the positive pole of the second diode D2 is connected to an end of the second element switch SW2; in addition, the inductor L crosses over between the negative pole of the first diode D1 and the positive pole of the second diode D2.

In a preferred embodiment of the present invention, the inductor L is an energy storing element of the energy-transferring circuit 10. By controlling the ON and OFF status of the first element switch SW1 and the second element switch SW2, the energy-transferring circuit 10 can be made to be operated in the energy storing mode or energy-releasing mode. On the one hand, if the first element switch SW1 and the second element switch SW2 are controlled to be turned ON, single battery cells or serially connected battery strings that cross over between the node 1 and the node 4 will store electrical energy in the inductor L. On the other hand, if the first element switch SW1 and the second element switch SW2 are controlled to be OFF, or one element switch is turned ON and the other element switch is turned OFF, depending on the ON or OFF status of the first diode D1 and the second diode D2, the electrical energy of the inductor L will be released from two different nodes. In addition, according to the embodiment, the first element switch and the second element switch can be implemented with power semiconductor element switches such as insulated gate bipolar transistor (IGBT) or gate-turn-off thyristor (GTO) or silicon control rectifier (SCR).

Figure 8:
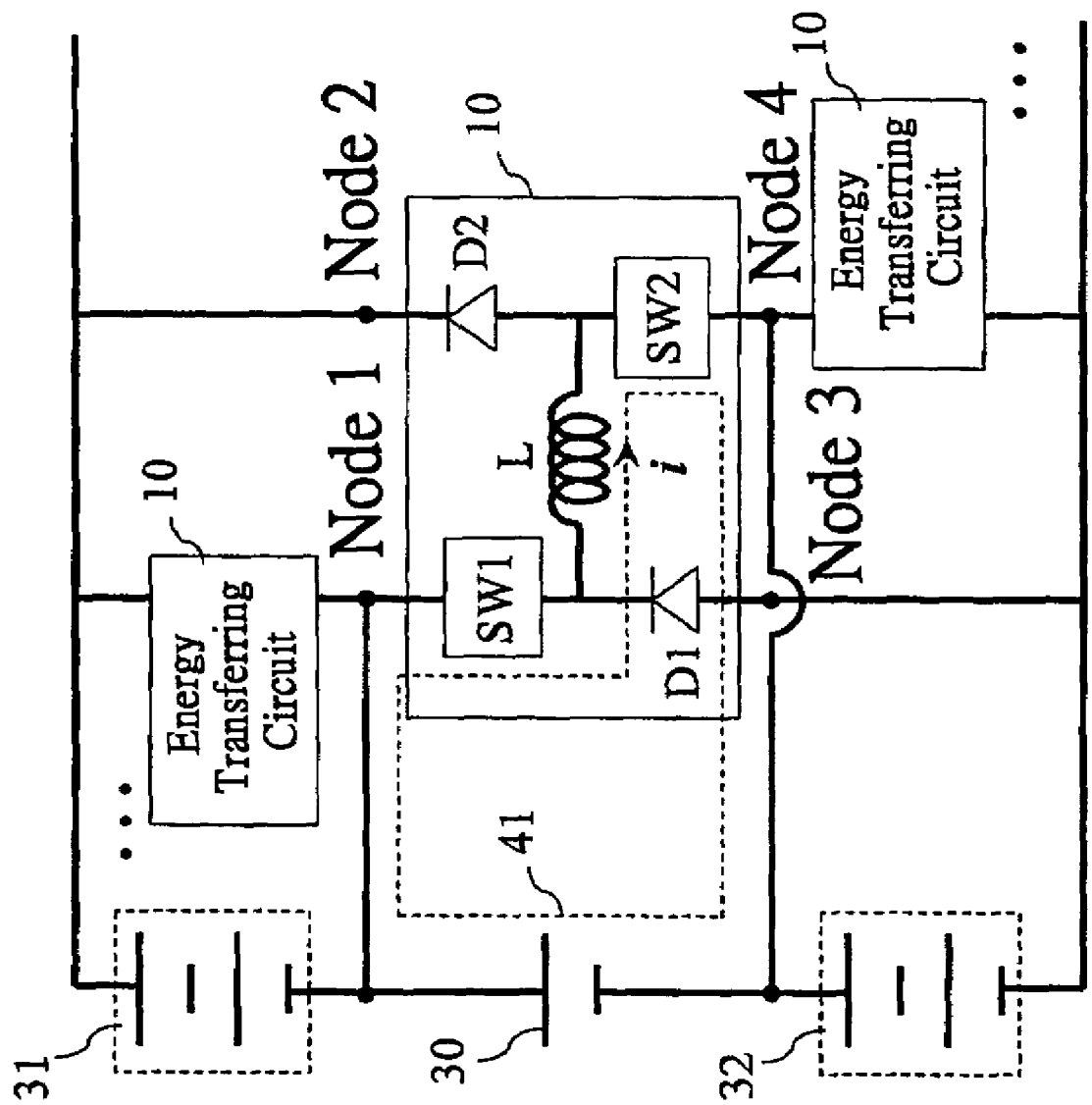
FIG. 8 shows a circuit structural view of the bridge battery voltage equalizer of the present invention, wherein an energy-transferring circuit clearly discloses the path of energy storing current.

FIG. 8 shows a circuit structural view of the bridge battery voltage equalizer of the present invention, wherein an energy-transferring circuit 10 clearly discloses the circuit architecture. According to the bridge battery voltage equalizer of the present invention, voltages between the serially connected battery strings can be equalized, and each energy-transferring circuit 10 can transfer the electrical energy of single battery cells or a battery group (of serially connected battery strings) to other serially connected battery strings. According to the embodiment of FIG. 8, the serially connected battery strings are sequentially consisted of a front battery series 31, an energy storing battery 30, and a back battery series 32. The energy storing battery 30 crosses over the node 1 and the node 4 of an energy-transferring circuit 10 in bridge architecture 20. When the first element switch SW1 and the second element switch SW2 are turned ON, the energy-transferring circuit 10 is operated in the energy storing mode, and the energy storing current i of the energy storing battery stores the electrical energy in the inductor L along the energy storing current path 41.

Figure 9:
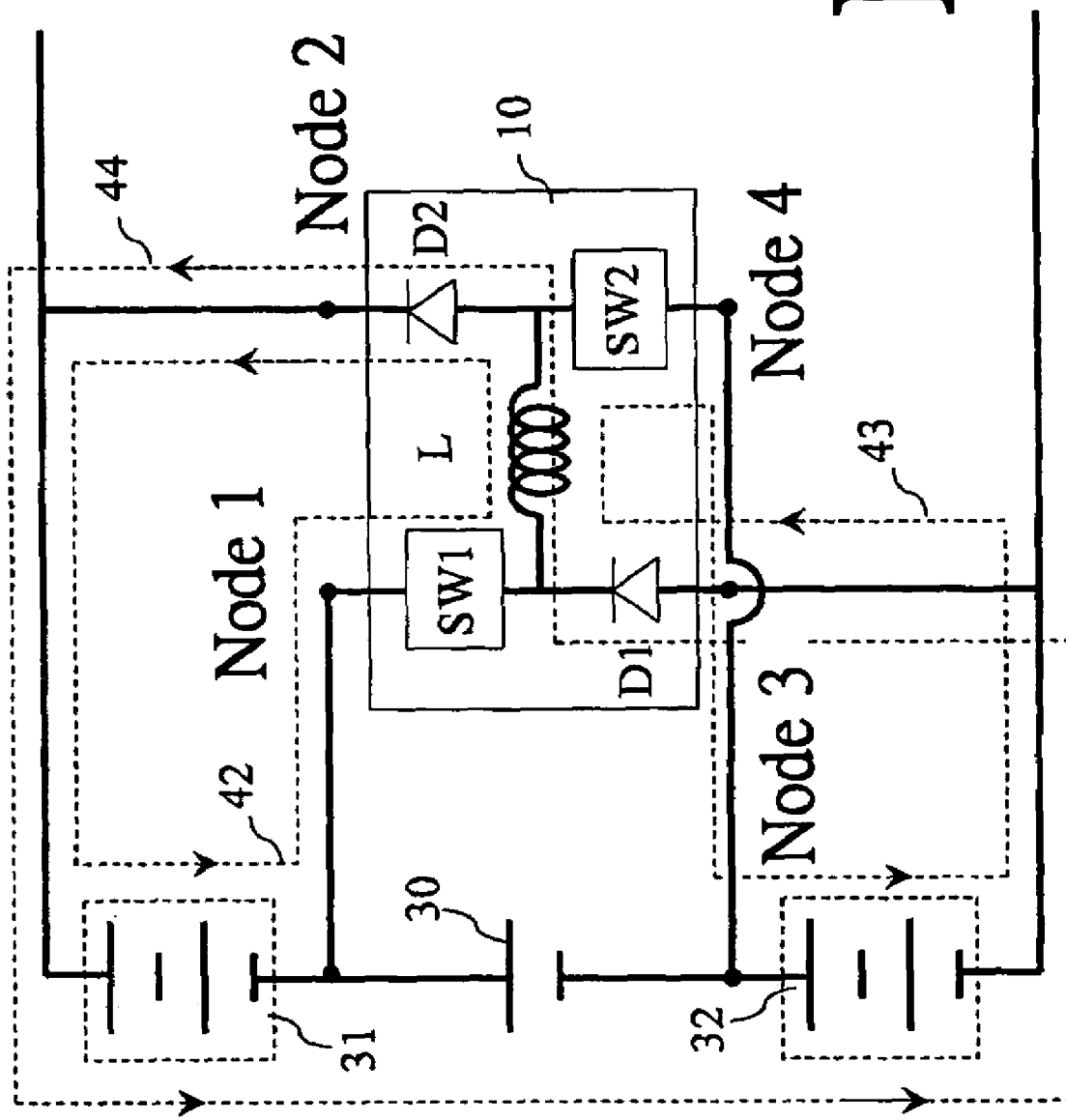
FIG. 9 shows the path of an energy-releasing current of the energy-transferring circuit of the present invention.

FIG. 9 shows the energy-releasing current path of the energy-transferring circuit of the present invention with the remaining energy-transferring circuit not depicted. When the first element switch SW1 is turned ON whereas the second element switch SW2 is turned OFF, the energy-transferring circuit 10 is in a first energy-releasing mode, in which the first diode D1 is cut off due to the bias voltage caused by the voltages of the serially connected energy storing battery 30 and the back battery series 32, whereas the second diode D2 is turned ON, the energy-releasing current i of the inductor L releases electrical energy to the front battery series 31 along the energy storing current path 42.

When the first element switch SW1 is turned OFF whereas the second element switch SW2 is turned ON, the energy-transferring circuit 10 is in a second energy-releasing mode, in which the second diode D2 is cut off due to the bias voltage caused by the voltages of serially connected front battery series 31 and energy storing battery 30, whereas the first diode D1 is turned ON, the energy-releasing current i of the inductor L releases electrical energy to the back battery series 32 along the energy storing current path 43.

When the first element switch SW1 and the second element switch SW2 are turned OFF, the energy-transferring circuit 10 is in a third energy-releasing mode, in which the first diode D1 and the second diode D2 are turned ON, and the energy-releasing current i of the inductor L releases electrical energy to the entire serially connected battery strings along the energy storing current path 44.

Figure 10:
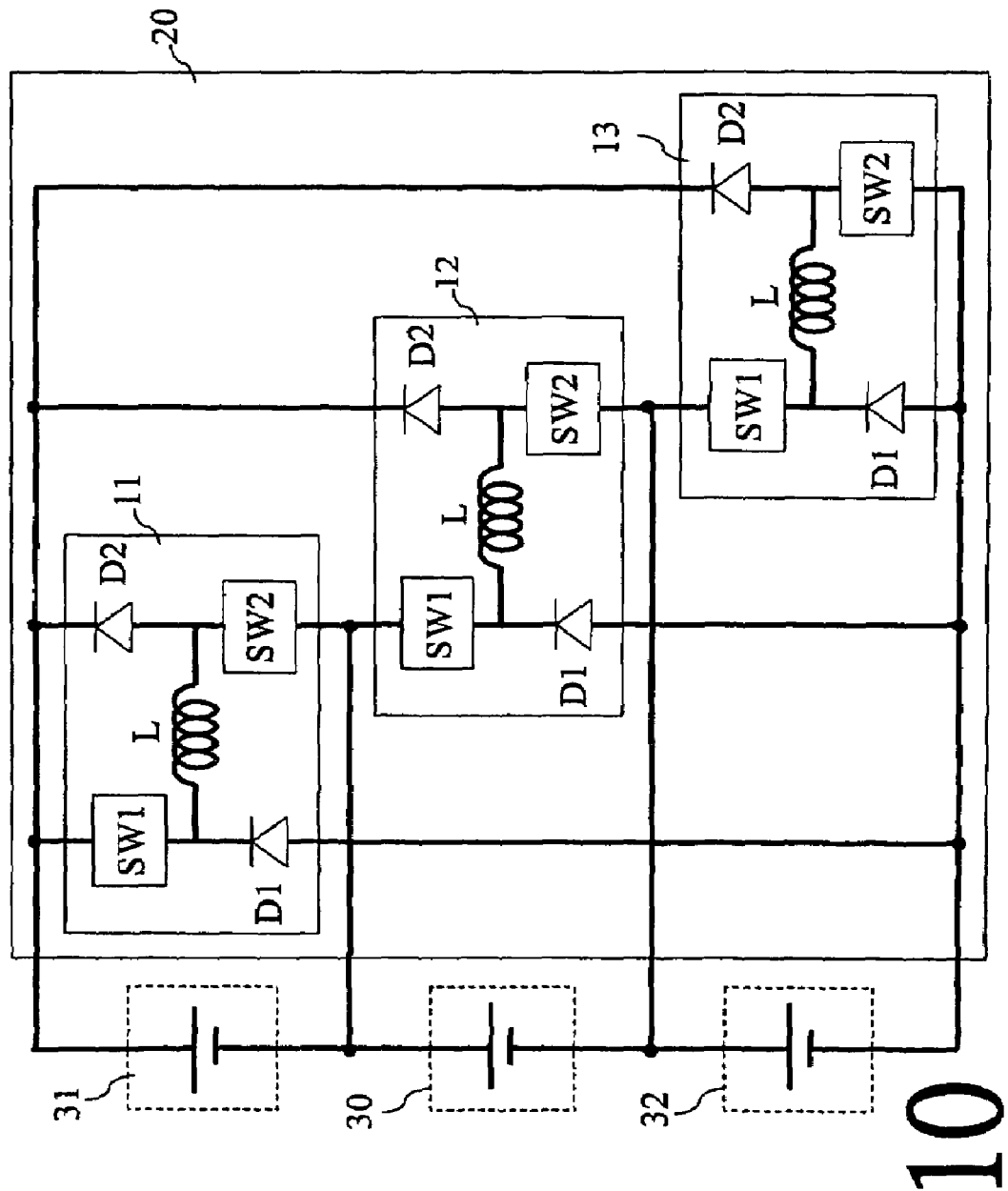
FIG. 10 shows a circuit structural view of the embodiment of the bridge battery voltage equalizer of the present invention.

Referring to FIG. 10, the circuit structural view of the embodiment of the bridge battery voltage equalizer of the present invention is shown. The embodiment is based on a bridge architecture formed by three energy-transferring circuits 11, 12, and 13 and each energy-transferring circuit can correspond to single battery cell, or serially connected battery cells, wherein node 1 and node 2 of the energy-transferring circuit 11 corresponding to a first single battery cell 31 or a first serially connected battery string 31 are interconnected, and the energy-transferring circuit 11 can only be operated in the second energy-releasing or the third energy-releasing mode, in order to release the stored electrical energy to the back battery series 30, 32 or all serially connected battery strings. Node 3 and node 4 of the energy-transferring circuit 13 corresponding to a last single battery cell 32 or a last serially connected battery string 32 are interconnected, and the energy-transferring circuit 13 can only be operated in the first energy-releasing or the third energy-releasing mode, in order to release the stored electrical energy to the front battery series 31, 30 or all serially connected battery strings.

The bridge battery voltage equalizer shown in FIG. 10 can be applied to the hierarchical battery bridge-equalizing device as shown in FIG. 5. When the energy-transferring circuits 11, 12, and 13 correspond to a single battery cell, this bridge battery voltage equalizer performs the first layer voltage equalizer of the hierarchical battery bridge-equalizing device. When the energy-transferring circuits 11, 12, and 13 correspond to the serially connected batteries formed by more than two batteries, this bridge battery voltage equalizer performs the second layer voltage equalizer or above of the hierarchical battery bridge-equalizing device.

When the switch controller 6 detects the charging states of the battery series 30, 31, and 32 reaching saturation, the switch controller 6 further controls the first element switches SW1 and the second element switches SW2 of the energy-transferring circuits 11, 12, and 13. When the first element switches SW1 and the second element switches SW2 are turned ON, the energy-transferring circuits 11, 12, and 13 can be seen as short circuit, or the bridge battery voltage equalizer shown in FIG. 10 can be seen as short circuit. As such, the charging current will pass through the bridge battery voltage equalizer, but not pass through the saturated battery series 30, 31, and 32 to prevent the battery series 30, 31, and 32 from over saturation. While the invention has been described by way of examples and in terms of preferred embodiments, it is to be understood that the invention is not limited thereto. To the contrary, it is intended to carry out various modifications and similar arrangements and procedures, and the scope of the appended claims therefore should be accorded the broadest interpretation so as to encompass all such modifications and similar arrangements and procedures. For example, the energy-transferring circuit of the bridge battery voltage equalizer can correspond to a single battery cell or a serially connected battery string; the bridge battery voltage equalizer is also applicable to the battery voltage-equalizing device based on single charge distribution.

What is claimed is:

1. A bridge battery voltage equalizer for equalizing voltages of serially connect battery strings, which is characterized in that:

at least one battery crosses over an energy-transferring circuit, said energy-transferring circuits are interconnected in a H-bride architecture, each of said energy-transferring circuit is composed of a first semiconductor switch, a first diode, a second semiconductor switch, a second diode and an inductor, wherein said first and second semiconductor switches are positioned diagonally with respect to said inductor, and said first and second diodes are positioned diagonally with respect to said inductor, said inductor crosses over negative nodes of said first diode and positive nodes of said second diode, and said battery connects with a third semiconductor switch; and a switch controller for detecting charging state of said battery to control said third semiconductor switch whether keep charging said battery;

wherein when one of said first and second semiconductor switches is turned OFF, said inductor release electrical energy to at least a part of the battery strings and further wherein when said first semiconductor switch and said second semiconductor switch of said energy-transferring circuit are both turned ON, at least one battery stores electrical energy into said inductor.

2. The bridge battery voltage equalizer as claimed in claim 1, wherein when said first semiconductor switch of said energy-transferring circuit is turned ON whereas said second semiconductor switch is turned OFF, said inductor releases electrical energy to a part of the serially connected battery strings.

3. The bridge battery voltage equalizer as claimed in claim 1, wherein when said first semiconductor switch of said energy-transferring circuit is turned OFF whereas said second semiconductor switch is turned ON, said inductor releases electrical energy to a part of the serially connected battery strings.

4. The bridge battery voltage equalizer as claimed in claim 1, wherein when said first semiconductor switch and said second semiconductor switch of said energy-transferring circuit are both turned OFF, said inductor releases electrical energy to the entire serially connected battery strings.

5. The bridge battery voltage equalizer as claimed in claim 1, wherein said first element switch, said second semiconductor switch and said third semiconductor switch are insulated gate bipolar transistors (IGBT).

6. The bridge battery voltage equalizer as claimed in claim 1, wherein said first element switch, said semiconductor element switch and said third semiconductor switch are gate-turn-off thyristors (GTO).

7. The bridge battery voltage equalizer as claimed in claim 1, wherein said first element switch, said second semiconductor switch and said third semiconductor switch are silicon control rectifier (SCR).

8. The bridge battery voltage equalizer as claimed in claim 1, wherein when said battery stop charging, said switch controller turns off said first semiconductor switch and said second semiconductor switch of said energy-transferring circuit to let said energy-transferring circuit be short circuit.

* * * * *